(12) United States Patent
Bach et al.

(10) Patent No.: US 6,921,862 B2
(45) Date of Patent: Jul. 26, 2005

(54) CONNECTOR FOR CONDUCTOR BARS

(75) Inventors: Michael Bach, Berlin (DE); Detlev Schmidt, Berlin (DE); Michael Sebekow, Berlin (DE); Guenter Seidler-Stahl, Berlin (DE); Ingo Thiede, Berlin (DE); Sezai Tuerkmen, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 202 days.

(21) Appl. No.: 10/258,656

(22) PCT Filed: Mar. 7, 2001

(86) PCT No.: PCT/DE01/00946
§ 371 (c)(1),
(2), (4) Date: Mar. 14, 2003

(87) PCT Pub. No.: WO01/84684
PCT Pub. Date: Nov. 8, 2001

(65) Prior Publication Data
US 2003/0166353 A1 Sep. 4, 2003

(30) Foreign Application Priority Data
Apr. 28, 2000 (DE) .......................................... 100 22 639

(51) Int. Cl.⁷ ............................................... H02G 5/00
(52) U.S. Cl. ................. 174/68.2; 174/71 B; 174/149 B; 361/611; 361/624; 439/212
(58) Field of Search ............................. 174/68.2, 70 B, 174/71 B, 72 B, 88 B, 99 B, 129 B, 133 B, 149 B; 361/605, 611, 624, 637, 648, 675; 439/212

(56) References Cited
U.S. PATENT DOCUMENTS 3,287,534 A 11/1966 Cellerini et al.
4,752,233 A 6/1988 Morby et al.
4,944,700 A 7/1990 Simon
5,196,987 A 3/1993 Webber et al.
5,351,165 A 9/1994 Hancock
5,364,203 A * 11/1994 Ishikawa .................. 174/71 B
6,201,722 B1 * 3/2001 Hutchins ................ 174/133 B
6,420,655 B1 * 7/2002 Yang et al. ............... 174/70 B
6,445,570 B1 * 9/2002 Leccia .......................... 361/605
6,489,567 B2 * 12/2002 Zachrai .................. 174/149 B
6,506,068 B2 * 1/2003 Wagener ..................... 439/213
6,521,837 B2 * 2/2003 Hilgert et al. ............ 174/99 B
6,603,075 B1 * 8/2003 Soares et al. .............. 174/72 B
6,616,465 B1 * 9/2003 Fontana et al. ............. 439/110
6,674,006 B1 * 1/2004 Linehan et al. ........... 174/72 B
6,762,362 B1 * 7/2004 Cavanaugh et al. ....... 174/68.2
6,786,749 B2 * 9/2004 Meiners et al. ............. 439/213

FOREIGN PATENT DOCUMENTS

EP 0434349 6/1991
WO 99/22430 5/1999

* cited by examiner

Primary Examiner—Dean A. Reichard
Assistant Examiner—Adolfo Nino
(74) Attorney, Agent, or Firm—Harness, Dickey & Pierce, P.L.C.

(57) ABSTRACT

A connector for conductor bars, which are in-line or extend at a right angle with regard to one another and which rotate 90° around their longitudinal axes. The connector is comprised of a first contact piece and of a second contact piece of which the first contact piece is fastened in an eccentric manner, with regard to the longitudinal axis thereof, to the second contact piece at a position on the second contact piece that is also positioned in an eccentric manner with regard to the longitudinal axis. The first contact piece is connected to the second contact piece in such a manner that their longitudinal axes extend at a right angle with regard to one another but at a distance from one another so that the contact surfaces of the contact pieces do not intersect or overlap one another, but are adjacently arranged such that the pivot by 90° towards one another.

23 Claims, 3 Drawing Sheets

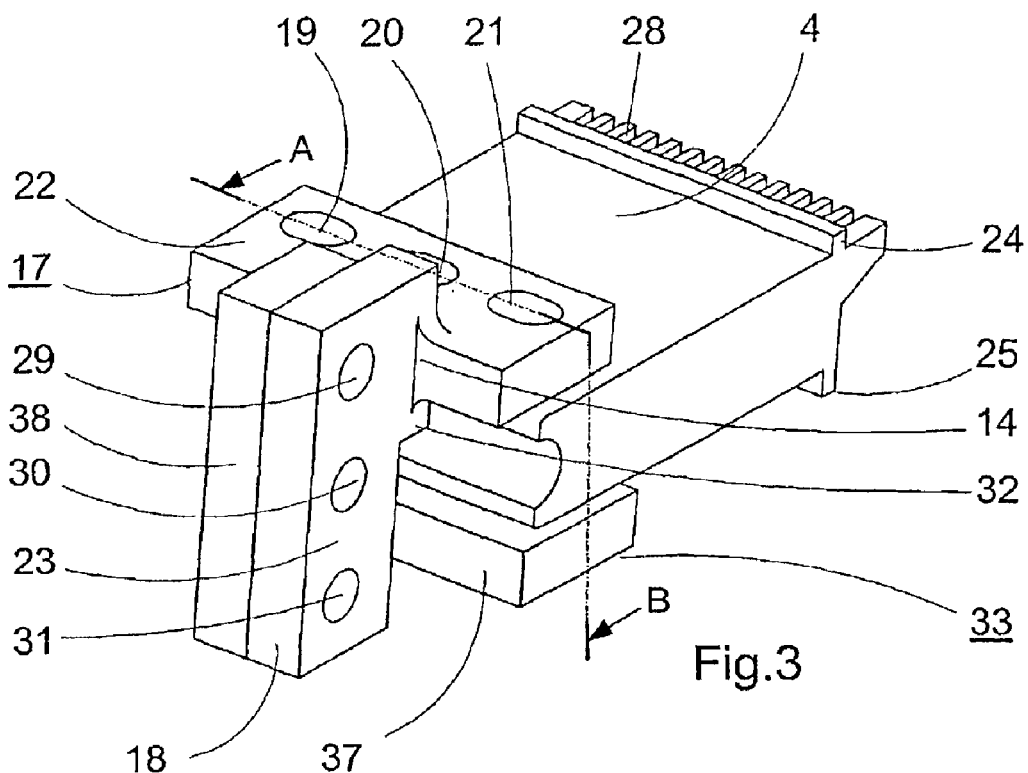
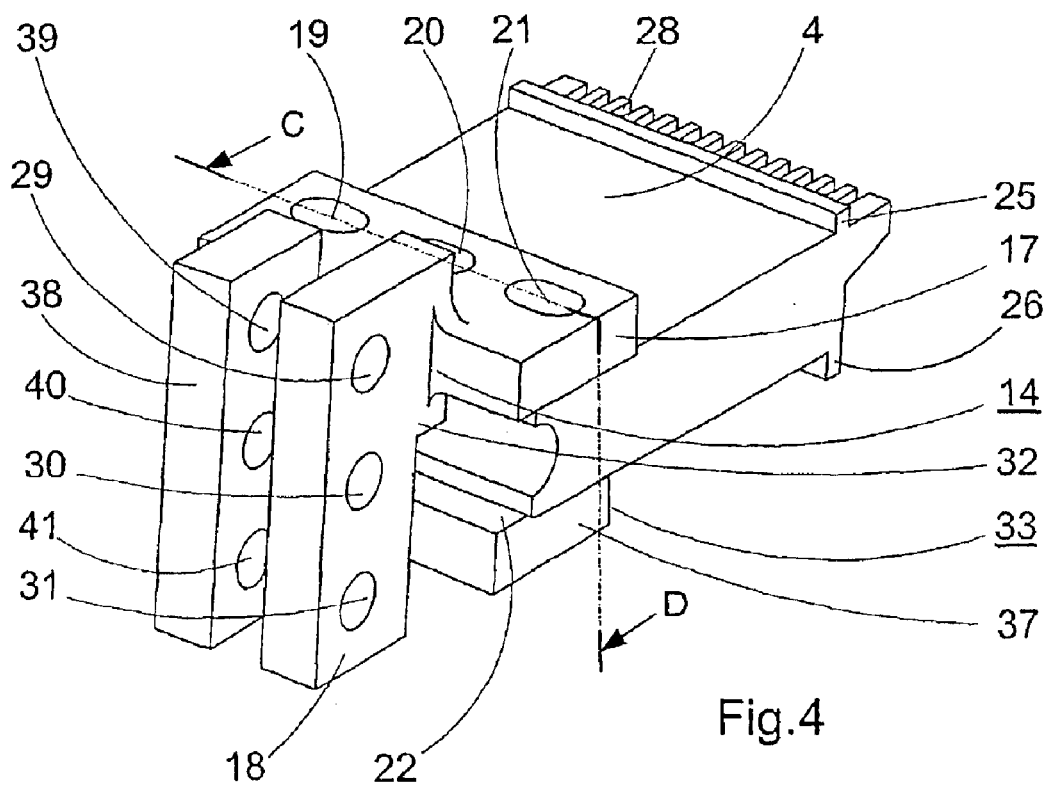

CONNECTOR FOR CONDUCTOR BARS

This application is the national phase under 35 U.S.C. § 371 of PCT International Application No. PCT/DE01/00946 which has an International filing date of Mar. 7, 2001, which designated the United States of America, and which claims priority on Patent Application No. 100 22 639.6 filed Apr. 28, 2000, the entire contents of which are hereby incorporated by reference.

FIELD OF THE INVENTION

The present invention generally relates to connectors for conductor bars, which are preferably suitable for connecting conductor bars of switching devices to system-side conductor bars in switchgear assemblies.

BACKGROUND OF THE INVENTION

Conductor bars are generally in the form of horizontal connecting rails, for example in the case of low-voltage circuit breakers. The conductor bars emerge flat, in the horizontal direction, out of the rear wall of the switch. They are highly suitable for horizontal continuation of the system-side conductor bars, for example for withdrawable switches. In many cases, specifically for fixed installation in a switchgear cubicle, vertical connections are required to the vertically running system-side conductor bars. This is because the conductor bars are routed at right angles to the switch from the conductor bar, which is arranged at the top, in a switchgear assembly, and also once again run vertically downward from the switch, via the transformers, to the cable.

Separate accessories are therefore required for the arrangement between the vertically running system-side conductor bars and the horizontally running connecting rails for the circuit breaker, which are screwed to the connecting rails for the circuit breaker and to the system-side conductor bars.

In a known electrical switch, a connector of this generic type is provided for at least one first and one second conductor bar, which each have at least one connecting surface for making contact with a respective contact surface of the connector. The connecting surface of the second conductor bar runs at right angles to the connecting surface of the first conductor bar and parallel to the axis of the current direction in the first conductor bar. Generally this is illustrated in patent document EP 0 434 349 A1. In the known connector, contact surfaces which are associated with the first conductor bar are formed from a shaped metal strip, and contact surfaces which are associated with the second conductor bar are formed from four contact fingers with the metal strip and the contact fingers being conductively connected to one another by way of a spring element.

It is also known for conductor bars to be in the form of solid parts, which are each suitable for only one specific rated current. This results in a large number of different parts and small quantities for the various current levels, associated with high component costs.

U.S. Pat. No. 3,287,534 discloses a large compact switch which has end-face connections and is specifically suitable for installation in switchgear assemblies. In this switch, the connections are not routed out of the enclosure, with threaded holes instead being provided in the connections, in the region of the enclosure wall. Connecting pieces which each have a square clamping surface and attachment holes arranged in a square are in each case screwed to these threaded holes by means of screws or bolts. A connecting web with a rectangular cross section projects out of the switch enclosure from said clamping surface. Depending on the position of the square clamping surface with respect to the connection in the switching device, the connecting web is aligned horizontally or vertically and allows simple connection to corresponding conductor bars which continue further.

U.S. Pat. No. 5,196,987 discloses another possible form for the transition from a horizontal conductor bar arrangement to a vertical conductor bar arrangement, with components which can be combined being used as connecting and connection parts. These parts are composed of a number of individual parts, and their construction is complicated.

In these solutions, a large number of different parts are required depending on the current level, and this leads to a wide range of parts, and high component costs associated with this.

SUMMARY OF THE INVENTION

An embodiment of the present invention is based on an object of designing a universal connector such that connections for transmitting different current levels can be provided for conductor bars which run at right angles to one another or which are aligned and are rotated through 90° about their longitudinal axes.

An object of an embodiment of the present invention is achieved in that the two contact surfaces are formed on in each case one contact piece of the connector, and in that the contact pieces are conductively connected to one another on faces which in each case run at right angles to their contact surface and are located eccentrically with respect to the respective contact piece.

At least one contact piece advantageously has an attachment on the side facing the other contact piece. Both contact pieces can also expediently have an attachment on the side facing the other contact piece. These attachments are used to provide a slot in each of them during the manufacture of the connector, the width of which slot corresponds to the thickness of the other contact piece. During mating of the connector, the mating contact piece is then inserted into this slot and is fixed by a suitable attachment method, such as welding or soldering. This satisfies the above requirement, in that the contact surfaces of the contact pieces of the connector do not intersect when mated, in that the conductor bars which are to be connected to them at right angles can be routed past them without any problems.

Furthermore, this form of attachment results in greater mechanical strength and, in addition, the current carrying capacity of the connection is increased by a larger conductive cross section. Both would possibly not be sufficient if the joint were made only on the narrow faces of the contact pieces.

The first contact piece in one advantageous refinement of an embodiment of the present invention is provided with elongated holes which are arranged in the direction of its longitudinal axis, thus allowing the connector to move transversely with respect to the axis of the conductor bar to be connected.

In this case, particularly when using two connectors, the length of the elongated holes is possibly dependent on the rail thickness of the conductor bars to be connected to the second contact pieces, especially when three conductor bars are intended to be connected, one of which is arranged between the two contact pieces of these two connectors, as will be described in detail in the next exemplary embodiment with reference to FIGS. 4 and 6.

In one embodiment of the present invention, the second contact piece is provided with holes which are arranged in the direction of its longitudinal axis, by way of which the system-side conductor bars to be connected can be attached by means of screws or bolts.

In the direction of their longitudinal axes, the contact pieces are advantageously approximately as wide as the conductor bars which are to be connected to them on both sides. Since, for example in the case of low-voltage circuit breakers, it is desirable to use connecting rails which have the same external dimensions for all current levels, this adaptation means that there is no increase in the large number of components in this field of application.

The asymmetric configuration of the connector and the arrangement of elongated holes in one of the two contact pieces can be achieved, for example, when using the connector for connecting vertical system-side conductor bars to horizontally arranged connecting rails for low-voltage circuit breakers by different installation orientations such that two such connectors, attached from underneath and from above, can optionally be combined such that the system-side contact pieces to which the system-side conductor bars are connected rest on one another or are arranged at a distance from one another. This results in a large number of connection options for the system-side conductor bars, since it is also possible to connect two or more conductor bars one above the other to each contact surface. All the desired connection variants can thus be satisfied.

The present invention will be explained in more detail in the following text, to assist understanding, on the basis of preferred exemplary embodiments, which do not restrict the scope of protection and with reference to the associated drawings. In the examples, the subject matter of the present invention is described with reference to the application for connecting horizontally running connecting rails for low-voltage circuit breakers to vertically running system-side conductor bars in low-voltage switchgear assemblies.

BRIEF DESCRIPTION OF THE DRAWINGS

FIG. 3 illustrates an arrangement of two connectors according to an embodiment of the present invention, on a connecting rail of a low-voltage circuit breaker;

FIG. 4 illustrates a further arrangement of two connectors according to an embodiment of the present invention, on a connection rail of a low-voltage circuit breaker;

DETAILED DESCRIPTION OF THE PREFERRED EMBODIMENTS

Figure 1:
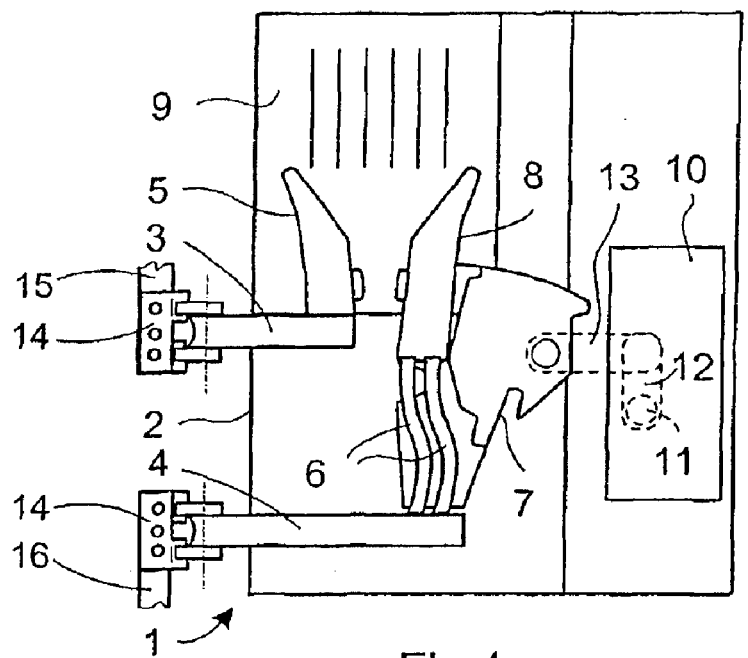
FIG. 1 illustrates, schematically, and in the form of a section, a low-voltage circuit breaker with connectors according to an embodiment of the present invention arranged on the connecting rails.

FIG. 1 shows schematically, and in the form of a section, a low-voltage circuit breaker 1. The upper connecting rail 3 and the lower connecting rail 4 are passed through the rear wall 2 of the low-voltage circuit breaker 1. The fixed switching contact 5 is located on the upper connecting rail 3, and the moving switching contact 8, which is located on a contact mount 7, is connected via flexible conductor connections 6 to the lower connecting rail 4. The arcing chamber 9 is arranged above the fixed switching contact 5 and the moving switching contact 8. The switch drive 10 contains the switching shaft 11 together with the switching shaft lever 12, to which the lug 13 is attached as a connection element for the contact mount 7. The connectors 14 according to an embodiment of the present invention are screwed to the connecting rails 3 and 4 and form the connection between the horizontal connecting rails 3 and 4 for the low-voltage circuit breaker 1 and the vertically running system-side conductor bars 15 and 16.

Figure 2:
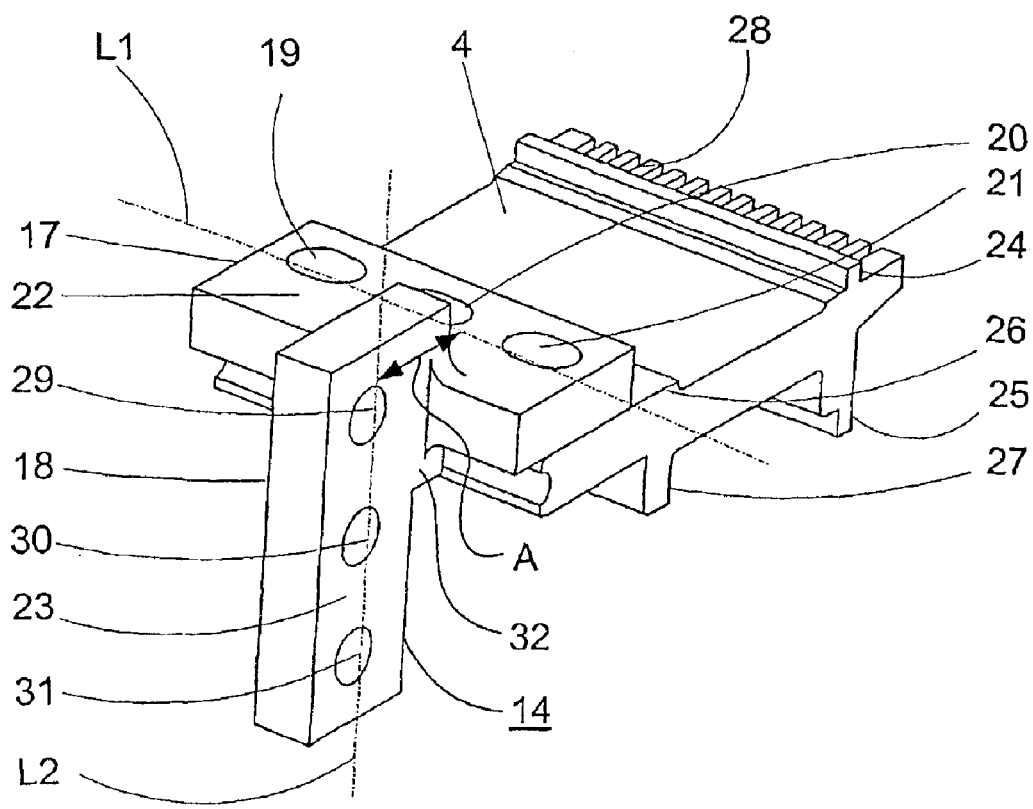
FIG. 2 illustrates one preferred embodiment of the connector according to the present invention, with a connecting rail for a low-voltage circuit breaker.

FIG. 2 shows the connection of one preferred embodiment of the connector 14 according to the present invention to a lower connecting rail 4 for a low-voltage circuit breaker 1. Projections 24, 25, 26, 27 for supporting and fixing the lower connecting rail 4 on the switch enclosure can be seen on the lower connecting rail 4, as well as comb-like cutouts 28 for holding the flexible conductor connections 6 for the moving switching contact. In this arrangement, the connector 14 is designed for connecting the horizontally running lower connecting rail 4 to a vertically running system-side conductor bar which is not shown. The switch-side contact piece 17 of the connector 14 has three elongated holes 19, 20, 21 whose function will be described further below. The system-side contact piece 18 is attached eccentrically, between the centrally elongated hole 20 and an outer elongated hole 21, to the switch-side contact piece 17, in a plane pivoted through 90°, to be precise such that the longitudinal axes L1, L2 of the two contact pieces 17, 18 run at right angles to one another but at a distance A from one another, so that the contact surface 22 of the switch-side contact piece 17 and the contact surface 23 of the system-side contact piece 18 do not physically intersect, but are arranged alongside one another. Thus, as can be seen clearly in FIG. 1, the vertical system-side conductor bar 16 can be routed past the lower connecting rail 4 of the low-voltage circuit breaker 1 without any problems.

The system-side contact piece 18, which has three holes 29, 30, 31 for attachment of a system-side vertically running conductor bar, is likewise attached eccentrically, between the central hole 30 and the outer hole 29 to the switch-side contact piece 17. For secure attachment, it has a broadened region 32, by way of which the two contact pieces 17, 18 interlock by way of a tooth system at the attachment location. The two contact pieces 17, 18 are attached to one another by welding after being positioned in the tooth system. The double eccentric attachment of the contact pieces 17, 18 to one another allows the connector to be used universally, as will be described in the following text.

FIG. 3 shows an arrangement of two connectors 14, 33 according to an embodiment of the present invention on a lower connecting rail 4 for a low-voltage circuit breaker 1. Identical elements of the connecting rail 4 are provided with the same reference symbols as in FIG. 2, but will not be explained once again. In this combination, the connectors 14, 33 are designed for connecting the horizontally running lower connecting rail 4 to two vertically running system-side conductor bars, which are not illustrated. The connection is thus suitable for higher current levels. The connector 14 is in this case arranged at the top on the connecting rail 4, and the connector 33 is arranged underneath it.

With the aid of the elongated holes 19, 20, 21 in the connector 14 which is arranged at the top on the connecting rail 4, and with the aid of the elongated holes 34, 35, 36 (FIGS. 5 and 6) in the connector 33 which is arranged underneath the connecting rail 4, they can be moved parallel to one another, transversely with respect to the axis of the connecting rail 4 when a threaded bolt (which is not illustrated) is fitted, as will be explained later in conjunction with FIGS. 5 and 6.

The eccentric arrangement of the contact pieces 17, 18, 37, 38 of the connectors 14, 33 with respect to one another and the limbs of different length which are provided in this way mean that the system-side contact pieces 18, 38 are arranged parallel alongside one another, resting on one another, in the illustrated, mated arrangement of the connectors 14, 33, so that in each case one system-side conductor bar can be connected by being screwed on externally on each side, by way of the holes 29, 30, 31 and the holes 39, 40, 41 (FIG. 4). In this case the upper connector 14 is arranged such that the long limb of the system-side contact piece 18 extends downward, and the lower connector 33 is arranged such that the long limb of the system-side contact piece 38 points upward. This allows two system-side conductor bars, which are arranged at a distance from one another, to be connected without any problems.

FIG. 4 shows a further arrangement of two connectors 14, 33 according to an embodiment the present invention on a lower connecting rail 4 for a low-voltage circuit breaker 1.

In this combination, the connectors 14, 33 are designed for connecting the horizontally running lower connecting rail 4 to three vertically running system-side conductor bars, which are not illustrated. The connection can thus carry even greater current levels than the arrangement shown in FIG. 3.

In this case as well, the connector 14 is arranged at the top on the connecting rail 4, and the connector 33 is arranged underneath it. With the aid of the elongated holes 19, 20, 21, in the connector 14 which is arranged at the top on the connecting rail 4, and with the aid of the elongated holes 34, 35, 36 (FIGS. 5 and 6) in the connector 33 which is arranged underneath the connecting rail 4, they can be moved parallel to one another transversely with respect to the axis of the connecting rail 4 when threaded bolts, which are not illustrated, are inserted, as will be explained later in conjunction with FIGS. 5 and 6. The eccentric arrangement of the contact pieces 17, 18, 37, 38 of the connectors 14, 33 with respect to one another and the limbs of unequal length that they result in mean that the system-side contact pieces 18, 38 are arranged parallel alongside one another at a distance from one another in the illustrated arrangement in which the connectors 14, 33 are pushed apart from one another, with this separation corresponding to the thickness of a system-side conductor bar.

In consequence, in each case one conductor bar can be connected externally on each side of the system-side contact pieces 18, 38 by means of the holes 29, 30, 31, 39, 40, 41, and a third conductor bar can be connected between the two contact pieces 18, 38. In this arrangement, the upper connector 14 is once again in this case arranged such that the long limb of the system-side contact piece 18 extends downward, and the lower connector 33 is arranged such that the long limb of the system-side contact piece 38 points upward. This allows three system-side conductor bars, which are arranged at a distance from one another, to be connected without any problems.

Figure 5:
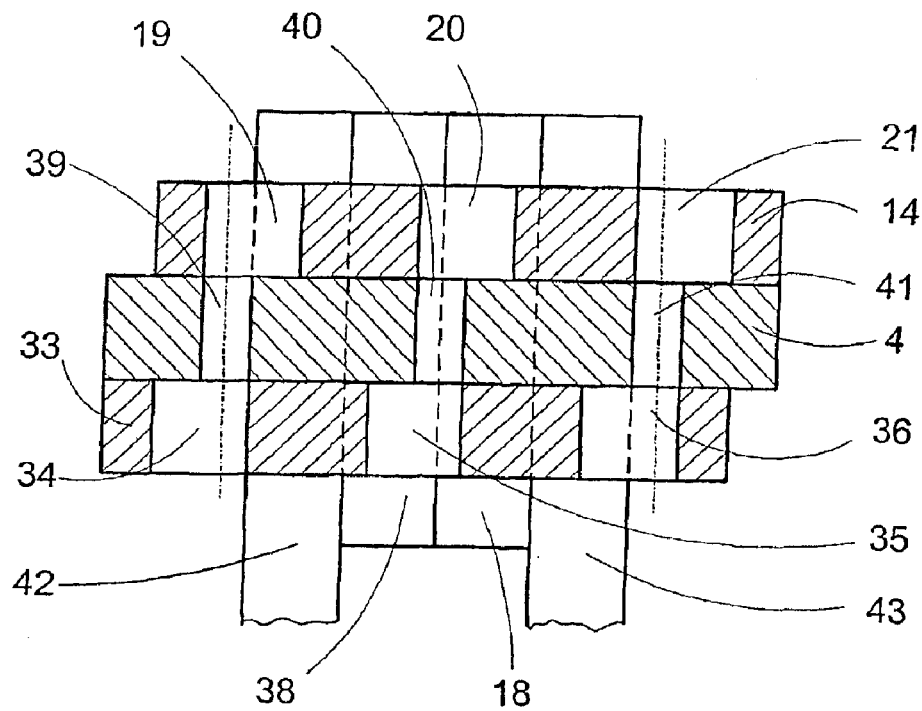
FIG. 5 illustrates a sectional illustration, along the section line A-B in FIG. 3.

FIG. 5 shows a section illustration along the section line A-B in FIG. 3, with two added system-side conductor bars 42, 43 which run vertically downward. As can be seen in FIG. 3, the connector 14 with the elongated holes 19, 20, 21 is arranged above the connecting rail 4, which is provided with holes 39, 40, 41, and the connector 33 with the elongated holes 34, 35, 36 is arranged underneath the connecting rail 4. The connectors 14, 33 are moved by means of the mobility provided by the elongated holes 19, 20, 21, 34, 35, 36 such that their system-side contact pieces 18, 38 touch. On their system-side, this results in a contact block which is formed from these contact pieces 18, 38 and to which, as described in conjunction with FIG. 3, two system-side conductor bars 42, 43, which are arranged at a distance from one another, can be connected.

Figure 6:
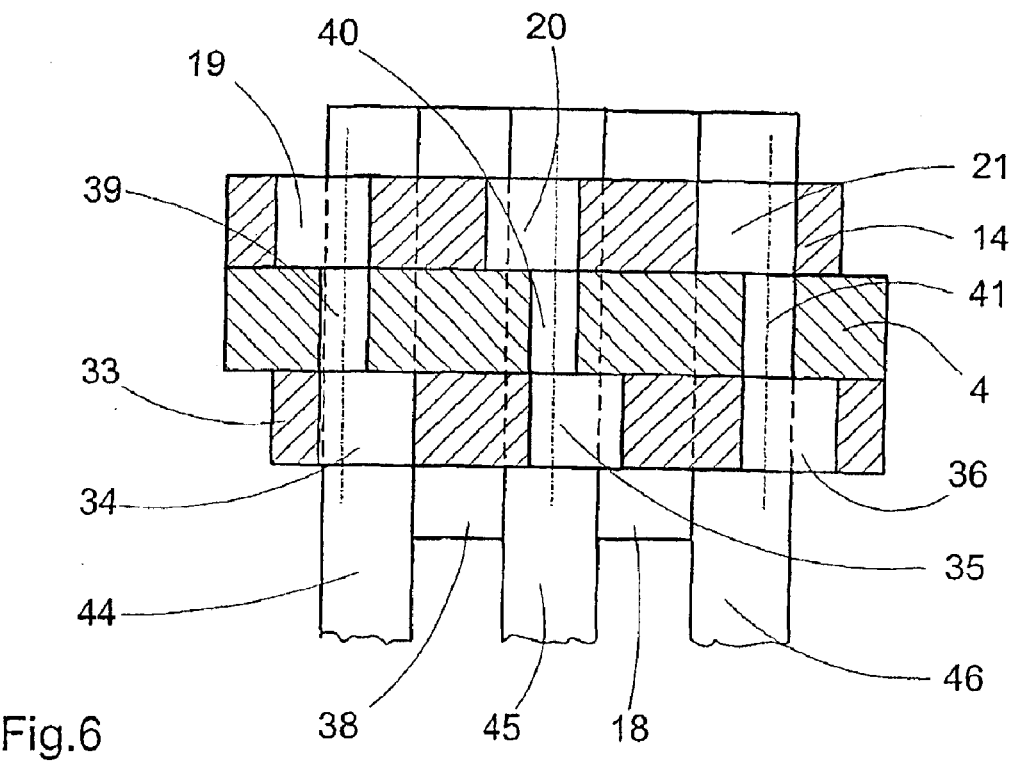
FIG. 6 illustrates a sectional illustration, along the section line C-D in FIG. 4.

FIG. 6 shows a section illustration along the section line C-D in FIG. 4, with three added system-side conductor bars 44, 45, 46 which run vertically downward. As can be seen in FIG. 4, the connector 14 with the elongated holes 19, 20, 21 is arranged above the connecting rail 4, which is provided with holes 39, 40, 41, and the connector 33 with the elongated holes 34, 35, 36 is arranged underneath the connecting rail 4. The connectors 14, 33 are moved by way of the mobility provided by the elongated holes 19, 20, 21, 34, 35, 36 such that their system-side contact pieces 18, 38 are arranged parallel alongside one another, at a distance from one another which corresponds to the thickness of a system-side conductor bar. In each case, one system-side conductor bar 44, 46 can thus be connected externally on each side of the system-side contact pieces 18, 38, and a third system-side conductor bar 45, as has already been described with reference to FIG. 4, can be connected between the two contact pieces 18, 38.

The advantages of the connector according to the present invention are that it can be used universally. It is possible to connect to one another not only conductor bars running at an angle to one another but also conductor bars which are aligned and rotated through 90° about their longitudinal axis. In this case, in addition to the described examples, two or more conductor bars can also be connected one above the other to every alternate contact piece on each contact surface, so that all the desired connection variants can be satisfied.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A connector for at least one first and one second conductor bar, the at least one first and one second conductor bar each have at least one connecting surface for making contact with a respective contact surface of the connector, with the connecting surface of the second conductor bar running at substantially perpendicular to the connecting surface of the first conductor bar and parallel to an axis of a current direction in the first conductor bar, comprising:

two contact surfaces being formed on in each case one contact piece of the connector, wherein the contact pieces are conductively connected to one another on faces which in each case run substantially perpendicular to their contact surface and are located eccentrically with respect to the respective contact piece.

2. The connector as claimed in claim 1, wherein at least one contact piece has an attachment on the side facing the other contact piece.

3. The connector as claimed in claim 2, wherein in order to attach the connector to the first conductor bar, a first of the two contact pieces is provided with elongated holes, the elongated holes being aligned along a longitudinal axis which is common thereto, the longitudinal axis running substantially perpendicular to the contact surface of the second contact piece.

4. The connector as claimed in claim 2, wherein in order to attach the connector to the second conductor bar, the second contact piece is provided with holes, the holes being aligned along a common longitudinal axis, with the longitudinal axis running substantially perpendicular to the contact surface of the first contact piece.

5. The connector as claimed in claim 2, wherein the contact surface of the contact piece and the connecting surface of the conductor bar on which the contact piece rests are each of approximately the same width at right angles to the axis of the current direction of the conductor bar.

6. The connector as claimed in claim 2, wherein the first contact piece, which rests on the first conductor bar, is offset with respect to a central arrangement on the second contact piece, which rests on the second conductor bar, such that when the connector is connected to a second connecting face of the first conductor bar in a position rotated through 180° about the axis of the current direction in the conductor bar, the second contact surface is arranged substantially aligned with respect to a surface normal thereof, in comparison to a position before rotation.

7. The connector as claimed in claim 2, wherein the first contact piece, which rests on the first conductor bar, is offset with respect to a central arrangement on the second contact piece, which rests on the second conductor bar, such that when the connector is connected to a second connecting face of the first conductor bar in a position rotated through 180° about the axis of the current direction in the conductor bar, the second contact surface is arranged substantially aligned with respect to a surface normal thereof, in comparison to a position before rotation.

8. The connector as claimed in claim 2, wherein the second contact piece, which rests on the second conductor bar is offset with respect to a central arrangement on the first contact piece, which rests on the first conductor bar such that when a second connector, which is pivoted through 180° with respect to the first connector about the axis of the current direction in the first conductor bar, is arranged, and for both contact surfaces which rest on one another and for second contact surfaces which are separated by an amount which corresponds to the thickness of the second conductor bar at right angles to its connecting surface, the first contact surfaces do not project beyond the first connecting surfaces in the direction at right angles to the axis of the current direction in the first conductor bar.

9. The connector as claimed in claim 1, wherein both contact pieces have an attachment on the side facing the respective other contact piece.

10. The connector as claimed in claim 9, wherein in order to attach the connector to the first conductor bar, a first of the two contact pieces is provided with elongated holes, the elongated holes being aligned along a longitudinal axis which is common thereto, the longitudinal axis running substantially perpendicular to the contact surface of the second contact piece.

11. The connector as claimed in claim 9, wherein in order to attach the connector to the second conductor bar, the second contact piece is provided with holes, the holes being aligned along a common longitudinal axis, with the longitudinal axis running substantially perpendicular to the contact surface of the first contact piece.

12. The connector as claimed in claim 9, wherein the contact surface of the contact piece and the connecting surface of the conductor bar on which the contact piece rests are each of approximately the same width at right angles to the axis of the current direction of the conductor bar.

13. The connector as claimed in claim 9, wherein the first contact piece, which rests on the first conductor bar, is offset with respect to a central arrangement on the second contact piece, which rests on the second conductor bar, such that when the connector is connected to a second connecting face of the first conductor bar in a position rotated through 180° about the axis of the current direction in the conductor bar, the second contact surface is arranged substantially aligned with respect to a surface normal thereof, in comparison to a position before rotation.

14. The connector as claimed in claim 9, wherein the second contact piece, which rests on the second conductor bar is offset with respect to a central arrangement on the first contact piece, which rests on the first conductor bar such that when a second connector, which is pivoted through 180° with respect to the first connector about the axis of the current direction in the first conductor bar, is arranged, and for both contact surfaces which rest on one another and for second contact surfaces which are separated by an amount which corresponds to the thickness of the second conductor bar at right angles to its connecting surface, the first contact surfaces do not project beyond the first connecting surfaces in the direction at right angles to the axis of the current direction in the first conductor bar.

15. The connector as claimed in claim 1, wherein in order to attach the connector to the first conductor bar, a first of the two contact pieces is provided with elongated holes, the elongated holes being aligned along a longitudinal axis which is common thereto, the longitudinal axis running substantially perpendicular to the contact surface of the second contact piece.

16. The connector as claimed in claim 15, wherein in order to attach the connector to the second conductor bar, the second contact piece is provided with holes, the holes being aligned along a common longitudinal axis, with the longitudinal axis running substantially perpendicular to the contact surface of the first contact piece.

17. The connector as claimed in claim 15, wherein the contact surface of the contact piece and the connecting surface of the conductor bar on which the contact piece rests are each of approximately the same width at right angles to the axis of the current direction of the conductor bar.

18. The connector as claimed in claim 15, wherein the second contact piece, which rests on the second conductor bar is offset with respect to a central arrangement on the first contact piece, which rests on the first conductor bar such that when a second connector, which is pivoted through 180° with respect to the first connector about the axis of the current direction in the first conductor bar, is arranged, and for both contact surfaces which rest on one another and for second contact surfaces which are separated by an amount which corresponds to the thickness of the second conductor bar at right angles to its connecting surface, the first contact surfaces do not project beyond the first connecting surfaces in the direction at right angles to the axis of the current direction in the first conductor bar.

19. The connector as claimed in claim 1, wherein in order to attach the connector to the second conductor bar, the second contact piece is provided with holes, the holes being aligned along a common longitudinal axis, with the longitudinal axis running substantially perpendicular to the contact surface of the first contact piece.

20. The connector as claimed in claim 19, wherein the contact surface of the contact piece and the connecting surface of the conductor bar on which the contact piece rests are each of approximately the same width at right angles to the axis of the current direction of the conductor bar.

21. The connector as claimed in claim 1, wherein the contact surface of the contact piece and the connecting surface of the conductor bar on which the contact piece rests are each of approximately the same width at right angles to the axis of the current direction of the conductor bar.

22. The connector as claimed in claim 1, wherein the first contact piece, which rests on the first conductor bar, is offset with respect to a central arrangement on the second contact piece, which rests on the second conductor bar, such that when the connector is connected to a second connecting face of the first conductor bar in a position rotated through 180° about the axis of the current direction in the conductor bar, the second contact surface is arranged substantially aligned with respect to a surface normal thereof, in comparison to a position before rotation.

23. The connector as claimed in claim 1, wherein the second contact piece, which rests on the second conductor bar is offset with respect to a central arrangement on the first contact piece, which rests on the first conductor bar such that when a second connector, which is pivoted through 180° with respect to the first connector about the axis of the current direction in the first conductor bar, is arranged, and for both contact surfaces which rest on one another and for second contact surfaces which are separated by an amount which corresponds to the thickness of the second conductor bar at right angles to its connecting surface, the first contact surfaces do not project beyond the first connecting surfaces in the direction at right angles to the axis of the current direction in the first conductor bar.

* * * * *